R. & C. S. BIXBY & J. GARST.
PLANING MACHINE.
No. 8,086.                             Patented May 13, 1851.
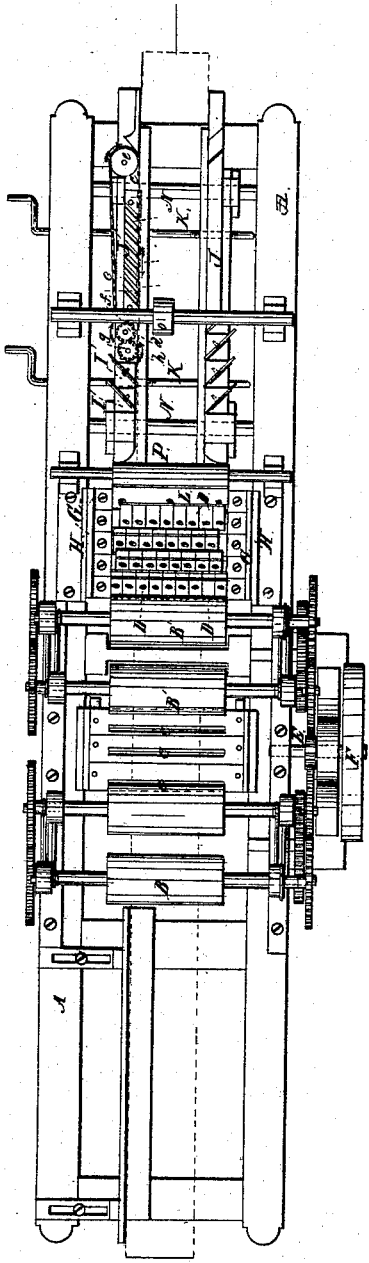
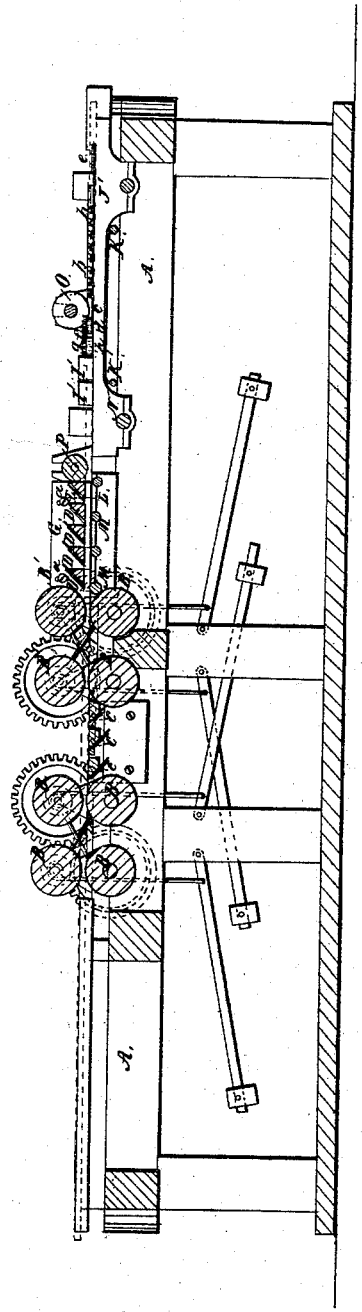

UNITED STATES PATENT OFFICE.

RUFUS BIXBY, C. S. BIXBY, AND JOHN GARST, OF DAYTON, OHIO.

PLANING-MACHINE.

Specification of Letters Patent No. 8,086, dated May 13, 1851.

*To all whom it may concern:*

Be it known that we, RUFUS BIXBY, C. S. BIXBY, and JOHN GARST, all of Dayton, in the county of Montgomery, in the State of Ohio, have invented certain new and useful Improvements in Machinery for Planing, Tonguing, and Grooving Lumber; and we do hereby declare that the following is a full, clear, and exact description of the same, reference being had to the accompanying drawings of the same, forming part of this specification, in which—

Figure 1 is a plan view. Fig. 2 is a longitudinal vertical section taken at or near the center. Fig. 3 is a view of one of the thicknessing planes. Fig. 4 is an edge view of the grooving cutters, and clearing chain. Fig. 5 is a back view of one of the cutters, showing also the clearing chain in section.

Similar letters of reference indicate corresponding parts in each of the several figures.

Our invention relates to that form of planing machinery in which stationary planes and tonguing and grooving cutters are employed.

It consists, first, in an improvement in the form and arrangement of the thicknessing planes, and, second, in the employment of an endless chain or band, working in a recess in one or both sides of the grooving cutters, to prevent the recesses at the back of the cutting edges being choked or clogged by the shavings or dust produced in cutting the groove in the stuff.

To enable others skilled in the art to make and use our invention we will proceed to describe its construction and operation.

A, represents the framing on which the machinery is suported.

B, B, are two pairs of feeding rollers, and B′ B′, other pairs of feeding rollers, for carrying forward the stuff to the planes. These rollers are all driven by toothed wheels on their shafts, which receive motion through a toothed pinion on the main or driving shaft E, which is driven by a drum F.

C, C, are a set of straight edged planes secured permanently so as to plane the under side of the board smooth.

D, D, are the thicknessing planes which are narrow planes having a rounded or gouge shaped edge (see Fig. 3), they are arranged close together in rows or series, in an iron frame G, the said rows or series being placed one behind another, and the planes in each row so arranged that the planes of no two rows shall be exactly opposite each other, but that the face of the board shall be equally divided by the most prominent points of the cutting edges of the planes. In the same frame G, behind the planes D, D, are one or more straight edged planes L, extending all across, these are for finishing. The frame G, is adjustable at any height for the purpose of reducing the board to any required thickness, being secured by screw bolts *a*, *a*, passing through vertical slots, to carriages H, H, on the sides of the frame. Below it are a series of small rollers M, M, which form part of the bed on which the board runs.

I, I, are planes for reducing the board to its required width and planing the edges smooth. They are secured upon carriages J, J′, which are supported upon bars N, N, on which they slide, and are adjustable at any required distance apart by means of screws K, K′. The carriage J, carries the tonguing cutters and J′, carries the grooving cutters *b*, *b*, which may be of any known form and construction.

*c*, is an endless chain running on two pulleys *d*, and *e*, which turn freely on fixed vertical spindles, or pins on the top of the carriage J′, one side of this chain works in a recess in the shoulders, against which the edge of the board runs, below and behind the grooving cutters while the groove is being cut, and is parallel and nearly flush with the said shoulder but must not project beyond it. Secured to the pulley *d*, is a toothed wheel *f*, which gears into another toothed wheel *g*, to which is secured a small roller *h*, both the wheel and the roller turning freely on a spindle or pin secured on the carriage J′. The edge or periphery of the roller *h*, stands just even with the edge of the board being operated upon and will be set in motion by the contact of the board as it passes it.

P and O, are pressure rollers for holding down that part of the board whereon the edges are being planed tongued and grooved. The board is represented in Figs. 1 and 2, by red lines.

The operation of the machinery is as follows: Rotary motion is given to the main shaft E, and communicated to the feed rollers. The board is fed in at the end of the bed, to the left of the drawing and as the feed rollers B, B, draw it forward the planes C, C, smooth the lower side; the rollers B', B', then bring it to the planes D, D, which take off the shavings in narrow strips, and reduce it just so much that the smoothing plane or planes L, will finish it to the proper thickness. The planes D, will be found to operate more effectually than the straight edged planes now in use, especially in knotty stuff as only a small cutting surface will act upon a knot at the same moment, therefore the mechine is not so likely to be brought to a stop; they will also clear themselves better in cutting. From the thicknessing planes the board is carried to the planes I I and I', I', and reduced to the proper width, it then goes on to the tonguing and grooving cutters which operate in the usual manner. One disadvantage which has been found to exist in the employment of stationary grooving cutters cutting sideways, was that the dust and fine shavings collected under the cutters between the shoulders of the cutters or cutter blocks, and the edge of the board; this disadvantage we design to remedy by the employment of the chain $c$, which receives motion through the edge of the plank which comes in contact with, and gives rotary motion to the roller $h$, and wheel $g$, this giving motion to $f$, moves the pulley $d$, and the chain $c$, the direction of whose motion is shown by an arrow 2, this chain loosens any dust or shavings which may collect, and the board itself removes them as it travels along. The same effect may be produced though not so effectually by a cord or band.

What we claim as our invention and desire to secure by Letters Patent is—

The employment on one or both sides of the grooving cutters $b$, $b$, $b$, of a chain or band $c$, applied and operated in the manner substantially as and for the purpose herein described.

In testimony whereof we have hereunto signed our names before two subscribing witnesses.

RUFUS BIXBY.
CYRUS S. BIXBY.
JOHN GARST.

Witnesses:
A. GEIGER,
A. M. SCOTT.